US008185040B2

(12) United States Patent
Lauer et al.

(10) Patent No.: US 8,185,040 B2
(45) Date of Patent: May 22, 2012

(54) SYSTEM FOR MANAGING VOICE OVER INTERNET PROTOCOL COMMUNICATIONS IN A NETWORK

(75) Inventors: Bryan A. Lauer, Hinckley, IL (US); Jerry Stamatopoulos, North Aurora, IL (US)

(73) Assignee: GoGo LLC, Itasca, IL (US)

( * ) Notice: Subject to any disclaimer, the term of this patent is extended or adjusted under 35 U.S.C. 154(b) by 468 days.

(21) Appl. No.: 12/029,298

(22) Filed: Feb. 11, 2008

(65) Prior Publication Data

US 2008/0130539 A1 Jun. 5, 2008

Related U.S. Application Data

(63) Continuation-in-part of application No. 11/492,545, filed on Jul. 24, 2006, which is a continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935, which is a continuation-in-part of application No. 09/379,825, filed on Aug. 24, 1999, now Pat. No. 6,408,180.

(51) Int. Cl.
*H04K 3/00* (2006.01)
*H04W 4/00* (2009.01)
(52) U.S. Cl. .......................... 455/1; 455/404.2; 455/431
(58) Field of Classification Search .................. 359/145; 455/67.3, 69, 1, 431, 404.2, 103, 403, 445, 455/456.6; 370/468, 395.31; 342/37
See application file for complete search history.

(56) References Cited

U.S. PATENT DOCUMENTS

| | | | |
|---|---|---|---|
| 5,042,027 A | 8/1991 | Takase et al. | |
| 5,123,112 A | 6/1992 | Choate | |
| 5,134,709 A | 7/1992 | Bi et al. | |
| 5,212,804 A | 5/1993 | Choate | |
| 5,408,515 A | 4/1995 | Bhagat et al. | |
| 5,432,841 A | 7/1995 | Rimer | |
| 5,519,761 A | 5/1996 | Gilhousen | |
| 5,555,444 A | 9/1996 | Diekelman et al. | |
| 5,590,395 A | 12/1996 | Diekelman | |
| 5,651,050 A | 7/1997 | Bhagat et al. | |
| 5,659,304 A | 8/1997 | Chakraborty | |
| 5,678,174 A | 10/1997 | Tayloe | |

(Continued)

OTHER PUBLICATIONS

Casewell, I.E.; "The Provision of GSM Cellular Radio Environments With Passenger Aircraft Operating Over Europe"; IEEE Fifth International Conference; Dec. 11-14, 1989; pp. 172-176.

*Primary Examiner* — Kiet Doan
(74) *Attorney, Agent, or Firm* — Patton Boggs LLP

(57) ABSTRACT

The VoIP Management System is capable of identifying voice-based wireless devices and denying wireless communication services to these devices. The VoIP Management System also identifies VoIP packet data traffic, and this communication connection can be denied. The VoIP Management System can also identify encrypted VoIP packet data traffic (for a unique Source -Destination IP pair) based upon VoIP packet data traffic characteristics: packet timing, packet rate, and packet size, since VoIP services have a distinct packet data traffic pattern. When a VoIP call is detected, the VoIP Management System disrupts the identified VoIP packet data traffic, without modifying the packet data content, such as by adding sufficient latency to the Packet Data Unit of the packet data traffic to make the VoIP services unusable.

18 Claims, 3 Drawing Sheets

U.S. PATENT DOCUMENTS

| | | | |
|---|---|---|---|
| 5,740,535 | A | 4/1998 | Rune |
| 5,754,959 | A | 5/1998 | Ueno et al. |
| 5,805,683 | A | 9/1998 | Berberich, Jr. |
| 5,887,258 | A | 3/1999 | Lemozit et al. |
| 5,950,129 | A | 9/1999 | Schmid et al. |
| 5,956,644 | A | 9/1999 | Miller et al. |
| 5,970,395 | A * | 10/1999 | Weiler et al. ............... 455/67.13 |
| 5,995,805 | A | 11/1999 | Ogasawara et al. |
| 6,002,944 | A | 12/1999 | Beyda |
| 6,009,330 | A | 12/1999 | Kennedy, III et al. |
| 6,055,425 | A | 4/2000 | Sinivaara |
| 6,144,338 | A | 11/2000 | Davies |
| 6,195,529 | B1 | 2/2001 | Linz et al. |
| 6,263,206 | B1 | 7/2001 | Potochniak et al. |
| 6,314,286 | B1 | 11/2001 | Zicker |
| 6,324,398 | B1 | 11/2001 | Lanzerotti et al. |
| 6,392,692 | B1 | 5/2002 | Monroe |
| 6,393,281 | B1 | 5/2002 | Capone et al. |
| 6,430,412 | B1 | 8/2002 | Hogg et al. |
| 6,567,408 | B1 * | 5/2003 | Li et al. .................... 370/395.31 |
| 6,577,419 | B1 | 6/2003 | Hall et al. |
| 6,580,915 | B1 | 6/2003 | Kroll |
| 6,615,052 | B1 | 9/2003 | Parmenter |
| 6,643,496 | B1 * | 11/2003 | Shimoyama et al. ........... 455/69 |
| 6,690,928 | B1 | 2/2004 | Konishi et al. |
| 6,700,902 | B1 * | 3/2004 | Meyer .......................... 370/468 |
| 6,735,438 | B1 | 5/2004 | Sabatino |
| 6,735,500 | B2 | 5/2004 | Nicholas et al. |
| 6,754,489 | B1 | 6/2004 | Roux |
| 6,760,778 | B1 | 7/2004 | Nelson et al. |
| 6,788,935 | B1 | 9/2004 | McKenna et al. |
| 6,889,042 | B2 | 5/2005 | Rousseau et al. |
| 7,050,755 | B2 | 5/2006 | Kline |
| 7,280,535 | B1 | 10/2007 | Bergman et al. |
| 2002/0045444 | A1 | 4/2002 | Usher et al. |
| 2002/0090931 | A1 | 7/2002 | Papineau et al. |
| 2002/0123344 | A1 | 9/2002 | Criqui et al. |
| 2002/0155833 | A1 | 10/2002 | Borel |
| 2003/0050746 | A1 | 3/2003 | Baiada et al. |
| 2004/0142658 | A1 | 7/2004 | McKenna et al. |
| 2004/0203918 | A1 | 10/2004 | Moriguchi et al. |
| 2005/0071076 | A1 | 3/2005 | Baiada et al. |
| 2005/0221875 | A1 | 10/2005 | Grossman et al. |
| 2006/0064746 | A1 | 3/2006 | Aaron et al. |

* cited by examiner

SYSTEM FOR MANAGING VOICE OVER INTERNET PROTOCOL COMMUNICATIONS IN A NETWORK

CROSS-REFERENCE TO RELATED APPLICATIONS

This application is a continuation-in-part of US patent application Ser. No. 11/492,545 filed Jul. 24, 2006; which is a continuation of U.S. patent application Ser. No. 10/730,329 filed Dec. 7, 2003, now U.S. Pat. No. 7,113,780 issued Sep. 26, 2006; which is a continuation-in-part of U.S. patent application Ser. No. 09/686,923 filed Oct. 11, 2000, now U.S. Pat. No. 6,788,935 issued Sep. 7, 2004.

FIELD OF THE INVENTION

This invention relates to cellular communications and, in particular, to a system that manages Voice over Internet Protocol (VoIP) communications that are associated with a data communications device, such as a wireless device.

BACKGROUND OF THE INVENTION

It is a problem in the field of wireless communications to manage the wireless services provided by an aircraft network to passengers who are located in the aircraft as they roam among cell sites in the non-terrestrial cellular communication network. The aircraft network serves a plurality of subscribers, yet must, under present regulations, prohibit the use of the aircraft network for voice communications. The management of this network to enable aircraft-based subscribers to initiate data communications, but not voice communications, has yet to be addressed in existing wireless networks.

In the field of terrestrial cellular communications, it is common for a wireless subscriber to a initiate a one-to-one communication connection, which comprises a channel on the serving cell site, to access a desired communication service. These communication services can be traditional voice communications, data communications, or voice communications using a data connection via a VoIP communication connection. The VoIP communication connection is processed as a data communication connection by the terrestrial cellular network and is routed to a data network, such as the Internet. All of these communication connections are processed in terrestrial cellular communications without regard for the content or nature of the data that is conveyed.

When wireless subscribers enter the non-terrestrial cellular communication network (that is, they fly in an aircraft as passengers), they encounter a unique environment that is regulated by different rules than the terrestrial cellular network. In particular, airlines presently prohibit the use of wireless devices onboard an aircraft in flight to host voice communications. The problem with this directive is that traditional cell phones and the more advanced wireless devices and laptop computers are capable of voice communications as well as data communications. In addition, the data communication capabilities of the wireless devices can be utilized to access a data communication network that hosts VoIP communication services, thereby enabling the passenger to thwart the rules by using a data communication connection for voice calls. Furthermore, aircraft passengers using wireless devices (such as 802.11 capable devices) can connect to the aircraft network and establish a Virtual Private Network tunnel back to their corporate network, which may use encryption of the content of the data communications. At this point, the aircraft network has little to no visibility into the encrypted client application space; thus, the wireless device used by the aircraft passenger can utilize a VoIP service to host a voice call—which is not authorized.

BRIEF SUMMARY OF THE INVENTION

The above-described problems are solved and a technical advance achieved in the field by the present System For Managing Voice Over Internet Protocol Communications In A Network (termed "VoIP Management System" herein), which prevents wireless devices from implementing a VoIP call in selected circumstances, such as onboard an aircraft when the aircraft is in flight or not present at a terminal gate.

The VoIP Management System provides wireless communication services to subscribers, such as the passengers who are located onboard an aircraft, by storing data indicative of the individually identified wireless devices that are located onboard the aircraft to identify voice-based wireless devices. These identified voice-based wireless devices are denied service to prevent the hosting of voice calls. In addition, the VoIP Management System identifies VoIP packet data traffic when the destination is a VoIP service provider and this communication connection can be denied. The VoIP Management System can also identify encrypted VoIP packet data traffic (for a unique Source-Destination IP pair) based upon VoIP packet data traffic characteristics: packet timing, packet rate, and packet size, since VoIP services have a distinct packet data traffic pattern: periodic packet transmit/receive rate (~20-100 packets/second) and relatively small packets (~64-100 byte IP Packet Data Unit). When a VoIP call is detected, the VoIP Management System disrupts the identified VoIP packet data traffic, without modifying the packet data content, such as by adding sufficient latency to the Packet Data Unit of the packet data traffic to make the VoIP services unusable.

Thus, the VoIP Management System prevents the hosting of voice calls not only based upon the nature of the wireless device, or the destination of the call, but also by monitoring packet data traffic on data communication connections to detect the presence of a VoIP call. A detected VoIP call can be denied service or terminated by adjusting the processing of the packet data traffic to render the VoIP service unusable. This process can be used not only for aircraft-based communications, but also for ground-based systems which encounter the same issues in regulating the processing of VoIP calls.

DETAILED DESCRIPTION OF THE INVENTION

The VoIP Management System is capable of identifying voice-based wireless devices and denying wireless communication services to these devices. In addition, the VoIP Management System identifies VoIP packet data traffic when the destination is a VoIP service provider, and this communication connection can be denied. The VoIP Management System can also identify encrypted VoIP packet data traffic (for a unique Source-Destination IP pair) based upon VoIP packet data traffic characteristics: packet timing, packet rate, and packet size, since VoIP services have a distinct packet data traffic pattern: periodic packet transmit/receive rate (~20-100 packets/second) and relatively small packets (~64-100 byte IP Packet Data Unit). When a VoIP call is detected, the VoIP Management System disrupts the identified VoIP packet data traffic, without modifying the packet data content, such as by adding sufficient latency to the Packet Data Unit of the packet data traffic to make the VoIP services unusable. The operation of the VoIP Management System is described in the context of an aircraft environment, but it can function in any environment to prevent the hosting of voice calls and, more particularly, VoIP calls.

Overall System Architecture

Figure 1:
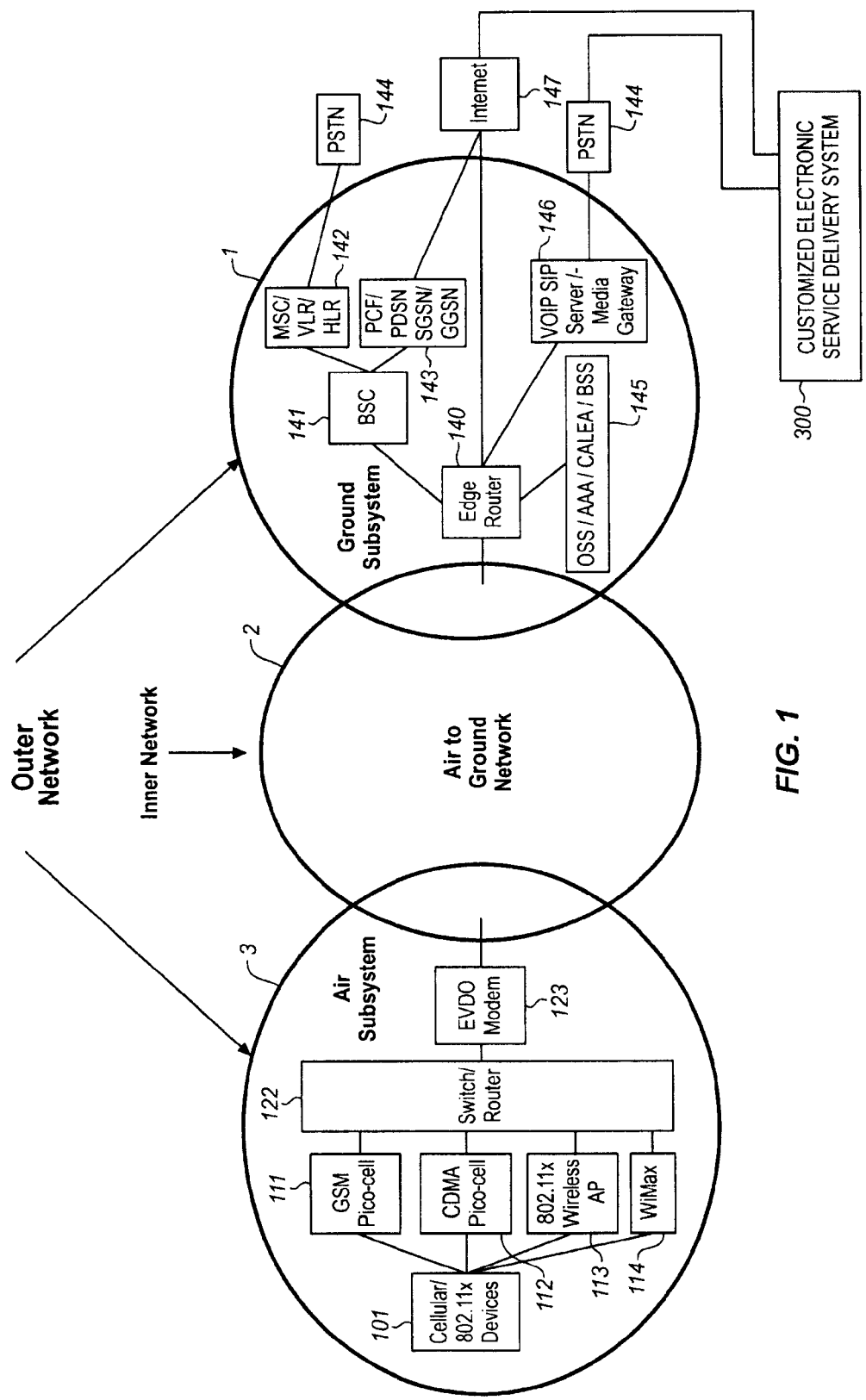
FIG. 1 illustrates, in block diagram form, the overall architecture of a composite air-to-ground network that interconnects an Air Subsystem with a Ground-Based Access Network.

FIG. 1 illustrates, in block diagram form, the overall architecture of the non-terrestrial cellular communication network, which includes an Air-To-Ground Network 2 (Inner Network) that interconnects the two elements of an Outer Network, comprising an Air Subsystem 3 and Ground Subsystem 1. This diagram illustrates the basic concepts of the non-terrestrial cellular communication network and, for the purpose of simplicity of illustration, does not comprise all of the elements found in a typical non-terrestrial cellular communication network. The fundamental elements disclosed in FIG. 1 provide a teaching of the interrelationship of the various elements which are used to implement a non-terrestrial cellular communication network to provide content to passengers' wireless devices which are located in an aircraft.

The overall concept illustrated in FIG. 1 is the provision of an "Inner Network" that connects the two segments of the "Outer Network", comprising the Air Subsystem 3 and the Ground Subsystem 1. This is accomplished by the Air-To-Ground Network 2 transmitting both the passenger communication traffic (comprising voice and/or other data) and control information and feature set data between the Air Subsystem 3 and the Ground Subsystem 1 thereby to enable the passengers' wireless devices that are located in the aircraft to receive services in the aircraft.

Air Subsystem

The "Air Subsystem" is the communications environment that is implemented in the aircraft, and these communications can be based on various technologies, including but not limited to: wired, wireless, optical, acoustic (ultrasonic), and the like. An example of such a network is disclosed in U.S. Pat. No. 6,788,935, titled "Aircraft-Based Network For Wireless Subscriber Stations".

The preferred embodiment for the Air Subsystem 3 is the use of wireless technology and for the wireless technology to be native to the passengers' wireless devices that passengers and crew carry on the aircraft. This network is illustrated as enabling both voice and data communication, but can be configured as a data-only communications network. Thus, a laptop computer can communicate via a WiFi or WiMax wireless mode (or via a wired connection, such as a LAN), or a PDA could communicate telephony voice traffic via VoIP (Voice over IP). Likewise, a handheld cell phone that uses the GSM protocol communicates via GSM when inside the aircraft to the Air Subsystem 3. A CDMA cell phone would use CDMA, and an analog AMPS phone would use analog AMPS when inside the aircraft to the Air Subsystem 3. The connection states could be packet-switched or circuit-switched or both. Overall, the objective of the Air Subsystem 3 is to enable seamless and ubiquitous access to the Air Subsystem 3 for the passengers' wireless devices that are carried by passengers and crew, regardless of the technology used by these wireless devices.

The Air Subsystem 3 also provides the mechanism to manage the provision of services to the passengers' wireless devices that are operating in the aircraft cabin. This management includes not only providing the passenger traffic connectivity but also the availability of non-terrestrial specific feature sets which each passenger is authorized to receive. These features include in-flight entertainment services, such as multi-media presentations, as well as destination-based services which link the passenger's existing travel plans with offers for additional services that are available to the passenger at their nominal destination and their planned travel schedule. The passenger thereby is presented with opportunities during their flight to enhance their travel experience, both in-flight and at their destination.

The passengers' wireless devices 101 used in the aircraft can be identical to those used on the cellular/PCS ground-based communication network 1; however, these passengers' wireless devices 101 are pre-registered with the carrier serving the aircraft and/or users have PIN numbers for authentication. In addition, an antenna interconnects the passengers' wireless devices 101 with the in-cabin Base Transceiver Stations (BTS) 111-114, which are typically pico-cells with BSC/MSC functions integrated. BTS/BSC/MSC modules are added for each air-interface technology supported. The Switch/Router 122 acts as the bridging function (for media/content and signaling to a limited extent) between the Air Subsystem 3 and the ground-based communication network 1, since the Switch/Router 122 places a call using the Modem 123 to the ground-based communication network 1 via the Air-To-Ground Network 2.

Air-to-Ground Network

The Air-to-Ground Network 2 shown in FIG. 1 is clearly one that is based on wireless communications (radio frequency or optical) between the Ground Subsystem 1 and the passengers' wireless devices that are located in the aircraft, with the preferred approach being that of a radio frequency connection. This radio frequency connection takes on the form of a cellular topology where typically more than one cell describes the geographic footprint or coverage area of the composite Air-To-Ground Network 2. The air-to ground connection carries both passenger communications traffic and native network signaling traffic. In the preferred embodiment, the Air-to-Ground Network 2 transports all traffic to/from the aircraft in a single, aggregated communication channel. This "single pipe" has distinct advantages in terms of managing hard and soft handoffs as the aircraft transitions between one ground-based cell to the next. This approach also takes advantage of newer, higher speed wireless cellular technologies.

Alternatively, the Air-To-Ground Network 2 could be achieved through a wireless satellite connection where radio frequency links are established between the aircraft and a satellite and between the satellite and the Ground Subsystem 1, respectively. These satellites could be geosynchronous (appears to be stationary from an earth reference point) or moving, as is the case for Medium Earth Orbit (MEO) and Low Earth Orbit (LEO). Examples of satellites include, but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link typically is unidirectional, that is, from the satellite to the receiving platform, in this case an aircraft. In such a system, a link transmitting unidirectionally from the aircraft is needed to make the communication bidirectional.

This link could be satellite or ground-based wireless in nature as previously described. Last, other means for communicating to aircraft include broad or wide area links such as HF (High Frequency) radio and more unique systems such as troposcatter architectures.

The Air-To-Ground Network 2 can be viewed as the conduit through which the passenger communications traffic as well as the control and network feature set data is transported between the Ground Subsystem 1 and the Air Subsystem 3. The Air-To-Ground Network 2 can be implemented as a single radio frequency link or multiple radio frequency links, with a portion of the signals being routed over different types of links, such as the Air-To-Ground Link and the Satellite Link. Thus, there is a significant amount of flexibility in the implementation of this system, using the various components and architectural concepts disclosed herein in various combinations.

Ground Subsystem

The Ground Subsystem 1 consists of Edge Router 140 which connects the voice traffic (if authorized) of the Air-To-Ground Network 2 with traditional cellular communication network elements, including a Base Station Controller 141 and its associated Mobile Switching Center 142 with its Visited Location Register, Home Location Register to interconnect the voice traffic to the Public Switched Telephone Network 144, and other such functionalities. In addition, the Base Station Controller 141 is connected to the Internet 147 via Public Switched Data Network 143 for call completions. Edge Router 124 also provides interconnection of the data traffic to the Internet 147, Public Switched Telephone Network 144 via Voice over IP Server 146, and other such functionalities. These include the Authentication Server, Operating Subsystems, CALEA, and BSS servers 145.

Thus, the communications between the passengers' wireless devices 101 located in an aircraft and the Ground Subsystem 1 of the ground-based communication network are transported via the Air Subsystem 3 and the Air-To-Ground Network 2 to the ground-based Base Station Controllers 141 of the non-terrestrial cellular communication network. The enhanced functionality described below and provided by the Air Subsystem 3, the Air-To-Ground Network 2, and the ground-based Base Station Controllers 141 renders the provision of services to the passengers' wireless devices 101 located in an aircraft transparent to the passengers. The Radio Access Network (RAN) supports communications from multiple aircraft and may employ a single omni-directional signal, or may employ multiple spatial sectors which may be defined in terms of azimuth and/or elevation angles. Aircraft networks hand over the Point-to-Point communication links between Radio Access Networks RAN) in different locations (different Ground Subsystems 1), in order to maintain continuity of service on Air-to-Ground Network 2. Handovers may be hard or soft, or may be a combination of hard and soft on the air-ground and ground-air links.

The Mobile Switching Center (MSC) provides mobility management for all airborne systems and provides hand over management between ground stations as an airborne system moves between the service areas of adjoining Ground Subsystems 1. The Base Station Controller (BSC) interfaces all traffic to/from the Base Transceiver Subsystem (BTS). The Packet Data Serving Node (PDSN) controls assignment of capacity of each of the Base Transceiver Subsystems (BTS) among the airborne systems within their respective service areas.

Typical Aircraft-Based Network

Figure 2:
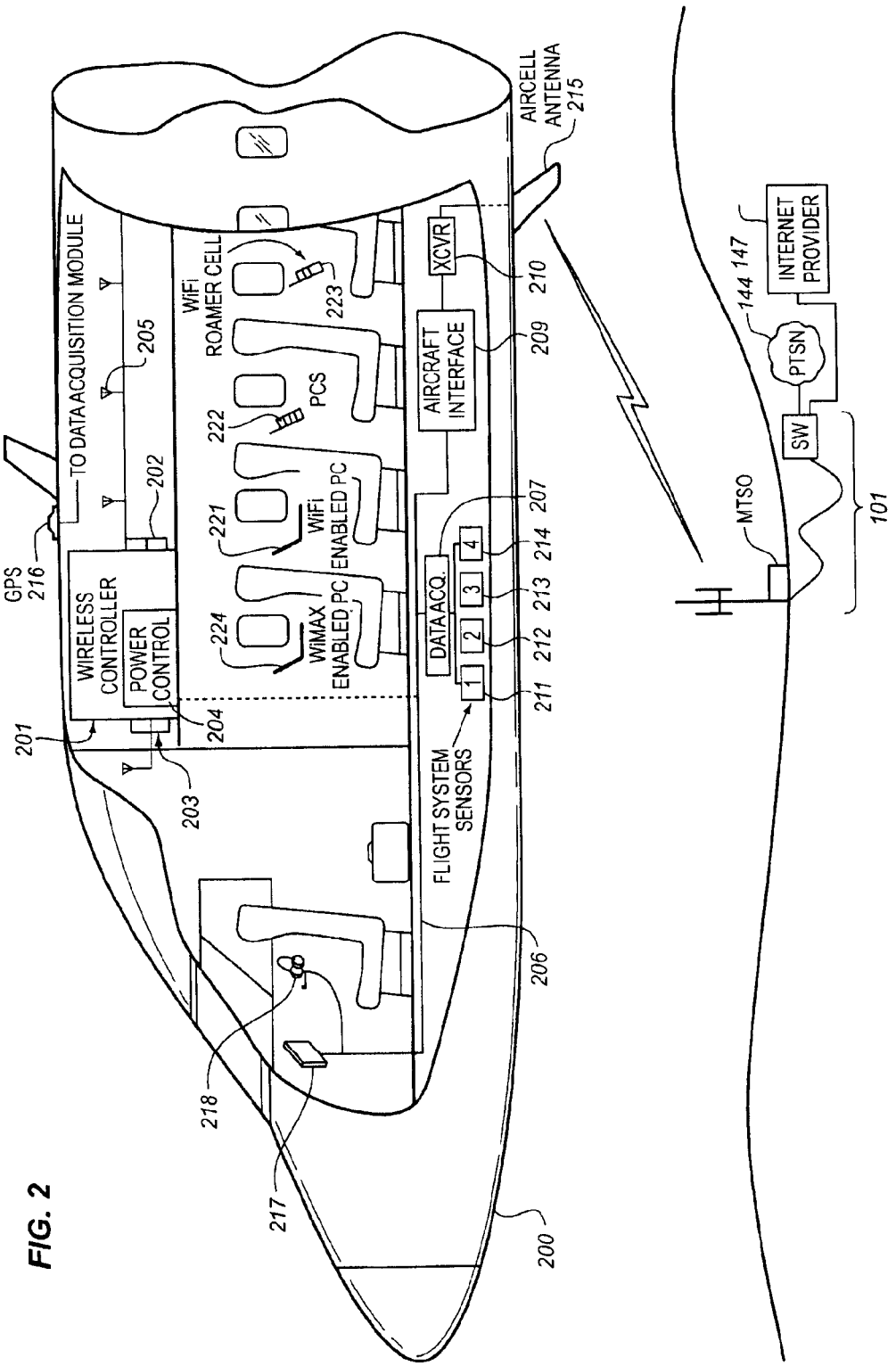
FIG. 2 illustrates, in block diagram form, the architecture of a typical embodiment of a typical aircraft-based network for wireless devices as embodied in a multi-passenger commercial aircraft.

FIG. 2 illustrates the architecture of a typical aircraft-based network for passengers' wireless devices as embodied in a multi-passenger commercial aircraft 200. This system comprises a plurality of elements used to implement a communication backbone that is used to enable wireless communication for a plurality of wireless communication devices of diverse nature. The aircraft-based network for passengers' wireless devices comprises a Local Area Network 206 that includes a radio frequency communication system 201 that uses a spread spectrum paradigm and having a short range of operation. This network 206 supports both circuit-switched and packet-switched connections from passengers' wireless devices 221-224 and interconnects the communications of these passengers' wireless devices 221-224 via a gateway transceiver or transceivers 210 to the Public Switched Telephone Network (PSTN) 144 and other destinations, such as the Internet 147 or Public Data Switched Network (PDSN). The wireless passengers thereby retain their single number identity as if they were directly connected to the Public Switched Telephone Network 144. The passengers' wireless devices 221-224 include a diversity of communication devices, such as laptop computers 221, cellular telephones 222, MP3 music players (not shown), Personal Digital Assistants (PDAs) (not shown), WiFi-based devices 223, WiMax-based devices 224, and the like, and for simplicity of description are all collectively termed "passengers' wireless devices" herein, regardless of their implementation specific details.

The basic elements of the aircraft-based network for passengers' wireless devices comprises at least one antenna 205 or means of coupling electromagnetic energy to/from the Air Subsystem 3 located within the aircraft 200 which serves to communicate with the plurality of passengers' wireless devices 221-224 located within the aircraft 200. The at least one antenna 205 is connected to a wireless controller 201 that encompasses a plurality of elements that serve to regulate the wireless communications with the plurality of passengers' wireless devices 221-224. The wireless controller 201 includes at least one low power radio frequency transceiver 202 for providing a circuit-switched communication space using a wireless communication paradigm, such as PCS, CDMA, or GSM, for example. In addition, the wireless controller 201 includes a low power radio frequency transceiver 203 for providing a data-based packet-switched communication space using a wireless communication paradigm, such as WiFi (which could also convey packet switched Voice over Internet Protocol (VoIP)).

Finally, the wireless controller 201 includes a power control segment 204 that serves to regulate the power output of the plurality of passengers' wireless devices. It also serves to, by RF noise or jamming apparatus, prevent In-Cabin passengers' wireless devices from directly and errantly accessing the ground network when in a non-terrestrial mode. The ultra-low airborne transmit power levels feature represents a control by the Power Control element 204 of the wireless controller 201 of the aircraft-based network for passengers' wireless devices to regulate the output signal power produced by the passengers' wireless devices 221-224 to minimize the likelihood of receipt of a cellular signal by ground-based cell sites or ground-based passengers' wireless devices.

It is obvious that these above-noted segments of the wireless controller 201 can be combined or parsed in various ways to produce an implementation that differs from that disclosed herein. The particular implementation described is selected for the purpose of illustrating the concept of the invention and is not intended to limit the applicability of this concept to other implementations.

The wireless controller 201 is connected via a Local Area Network 206 to a plurality of other elements which serve to provide services to the passengers' wireless devices 221-224. These other elements can include an Aircraft Interface 209 for providing management, switching, routing, and aggregation functions for the communication transmissions of the passengers' wireless devices. A data acquisition element 207 serves to interface with a plurality of flight system sensors 211-214 and a Global Positioning System element 216 to collect data from a plurality of sources as described below. Furthermore, pilot communication devices, such as the display 217 and headset 218, are connected to this Local Area Network 206 either via a wired connection or a wireless connection.

Finally, a gateway transceiver(s) 210 is used to interconnect the Aircraft Interface 209 to an antenna 215 to enable signals to be transmitted from the aircraft-based network for passengers' wireless devices to transceivers located on the ground. Included in these components is a communications router function to forward the communication signals to the proper destinations. Thus, signals that are destined for passengers on the aircraft are routed to these individuals, while signals routed to passengers located, for example, on the ground are routed to the Ground Subsystem. Aircraft antenna patterns that typically minimize nadir (Earth directed) effective radiated power (RP) may be used in the implementation of the antenna(s) 215 on the aircraft to serve the aircraft-based network for passengers' wireless devices.

Passenger Login for System Access

On each aircraft, the passenger access to electronic communications typically is regulated via a passenger's wireless device registration process, where each electronic device must be identified, authenticated, and authorized to receive service. Since the aircraft is a self-contained environment with respect to the wireless communications between the passengers' wireless devices and the airborne wireless network extant in the aircraft, all communications are regulated by the network controller. Thus, when a passenger activates their passenger's wireless device, a communication session is initiated between the passenger's wireless device and the network controller to identify the type of device the passenger is using and, thus, its wireless protocol. A "splash screen" is delivered to the passenger on their wireless device to announce entry into the wireless network portal. Once this is established, the network controller transmits a set of login displays to the passenger's wireless device to enable the passenger to identify themselves and validate their identity (if the passenger's wireless device is not equipped to automatically perform these tasks via a smart card which automatically logs the passenger into the network). As a result of this process, the passenger's wireless device is provided with a unique electronic identification (IP address), and the network can respond to the passenger's wireless device without further administrative overhead. The authentication process may include the use of security processes, such as a password, scan of a passenger immutable characteristic (fingerprint, retina scan, etc.), and the like. Once the passenger's wireless device is logged in, the passenger can access the free standard electronic services that are available from the network or customized electronic services for the particular passenger.

Regulation of Voice Calls

Government regulations in some jurisdictions and airline regulations presently prohibit the use of wireless devices onboard an aircraft to host voice communications, either when the aircraft is in flight or on the ground, but not at the airport terminal. The problem with enforcing this directive is that many traditional cell phones and the more advanced data-centric wireless devices, as well as laptop computers, are capable of both voice communications as well as data communications. The data communication capabilities of the wireless devices can be utilized to access a data communication network or service provider that hosts VoIP communication services, thereby enabling the passenger to thwart the prohibition on voice calls by using a data communication connection for voice calls. Aircraft passengers using wireless devices (such as 802.11 capable devices) can connect to the aircraft network, where they can connect to a VoIP service provider site or establish a Virtual Private Network tunnel back to their private network, which may use encryption of the content of the data communications. At this point, the aircraft network has little to no visibility into the encrypted client application space, and the wireless device used by the aircraft passenger can utilize a VoIP service to host a voice call—which is not authorized.

Voice Over Internet Protocol

Voice over Internet Protocol (VoIP) is a protocol optimized for transmission of voice through the Internet or other packet-switched networks. VoIP systems carry telephony signals as digital audio, typically reduced in data rate using speech data compression techniques, encapsulated in a data packet stream over IP. There are two types of Public Switched Telephone Network (PTSN) to VoIP services: Direct Inward Dialing (DID) and access numbers. Direct Inward Dialing connects the caller directly to the VoIP user, while the use of access numbers requires the caller to connect to a VoIP server, then input the extension number of the VoIP user.

It is a problem in Internet Protocol Networks that some of the data packets may fail to arrive at their intended destination. Transmission protocols such as TCP/IP permit receiving devices to request that missing packets be retransmitted; unfortunately, this retransmission process often results in long pauses in the data stream, as well as data transmission latencies of more than several hundred milliseconds, thereby rendering schemes such as TCP/IP inappropriate for most telephony applications. For these reasons, VoIP systems commonly use a transmission scheme called User Datagram Protocol, or UDP. This mechanism does not suffer from the pauses or transmission latencies that would be seen if TCP/IP were used for VoIP, chiefly because, unlike TCP/IP, there is no retransmission of missing packets. Instead, IP networks often try to reduce VoIP packet loss by assigning a higher priority (commonly referred to as Quality of Service or QoS) to UDP packets. Because UDP does not provide a mechanism to ensure that data packets are delivered in sequential order, or provide QoS guarantees, VoIP implementations face problems dealing with latency and jitter. This is especially true when satellite circuits are involved, due to long round trip propagation delay (400 milliseconds to 600 milliseconds for a geostationary satellite). The receiving node must restructure IP packets that may be out of order, delayed, or missing, while ensuring that the audio stream maintains a proper time consistency. This functionality is usually accomplished by means of a jitter buffer and/or the use of packet loss concealment algorithms that try to trick the human ear by replacing the missing packet with what is commonly referred to as "comfort noise."

Unless the level of packet loss becomes extreme (on the order of 5% or greater, depending on the audio encoding algorithm being used), the use of high quality packet loss concealment algorithms allows UDP to be an acceptable transmission protocol for person-to-person voice conversations. This is because it is relatively easy to trick the human ear into hearing something that isn't there. Unfortunately, the packet loss concealment algorithms of the present art do not mitigate the deleterious effects of packet loss on many accuracy-sensitive applications for which voice channels (and therefore UDP) are commonly used; examples include automatic speech recognition systems, automatic speaker identification systems, and the TTY/TDD communication commonly employed by people with hearing deficits.

VoIP Management System

The VoIP Management System 299 in the present embodiment is part of the aircraft network and can be connected to the wireless controller 201 or can be a part of the wireless controller 201 as a subroutine. The wireless controller 201 provides wireless communication services to passengers who are located onboard an aircraft by storing data indicative of the individually identified wireless devices that are located onboard the aircraft and using this data to manage their communication sessions.

Figure 3:
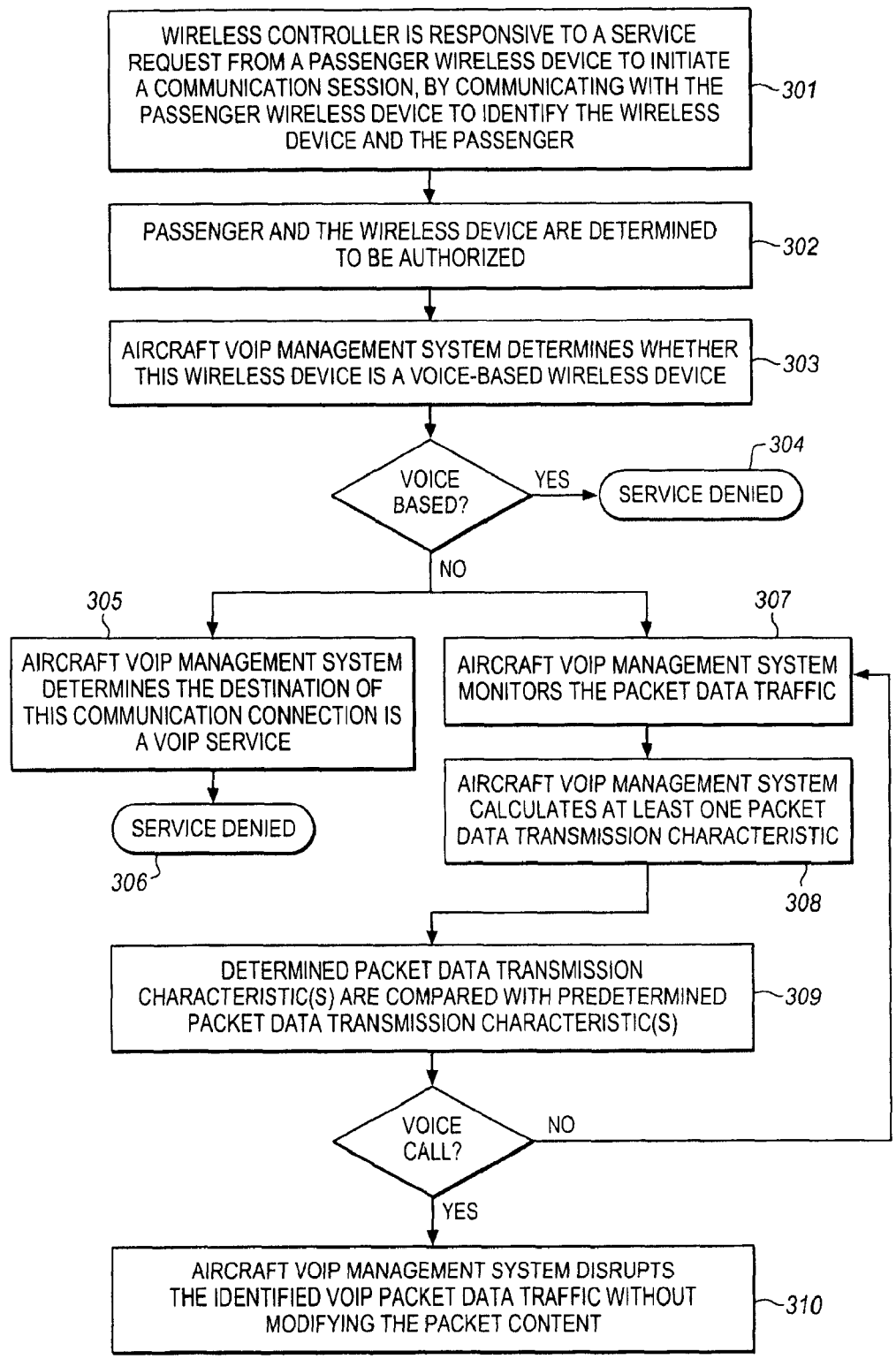
FIG. 3 illustrates, in flow diagram form, the typical operation of the VoIP Management System to block voice calls in an aircraft.

FIG. 3 illustrates, in flow diagram form, the typical operation of the VoIP Management System 299 to block voice calls in an aircraft. At step 301, the wireless controller 201 is responsive to a service request from a passenger's wireless device to initiate a communication session, by communicating with the passenger's wireless device to identify the wireless device and the passenger, to determine their authorization to receive service from the aircraft network. Once the passenger and the wireless device are determined to be authorized at step 302, the wireless device information is used by the VoIP Management System 299 at step 303 to determine whether this wireless device is a voice-based wireless device. These identified voice-based wireless devices are denied service at step 304 to prevent the hosting of voice calls.

If this wireless device is determined not to be a voice-based wireless device, the VoIP Management System 299 at step 305 identifies an attempt to initiate VoIP packet data traffic by determining that the destination of this communication connection is a VoIP service provider. This communication connection is then denied at step 306. The Web surfing of the passenger's wireless device must be monitored to determine whether the passenger attempts to access a VoIP service provider as part of their Internet connection.

The VoIP Management System 299 must also identify instances where the passenger connects their wireless device to a Virtual Private Network (VPN), such as a corporate network. The VPN may use data encryption for security purposes, the aircraft network has little to no visibility into the encrypted client application space, and the wireless device used by the aircraft passenger can utilize a VoIP service to host a voice call—which is not authorized. However, the VoIP Management System 299 can also identify encrypted VoIP data traffic (for a unique Source-Destination IP pair) based upon VoIP packet data traffic characteristics: packet timing, packet rate, and packet size. VoIP services have a distinct packet data traffic pattern: periodic packet transmit/receive rate (~20-100 packets/second) and relatively small packets (~64-100 byte IP Packet Data Unit).

Therefore, if the passenger's wireless device is a data-centric (or voice and data) device authorized to access the aircraft network and has established a data communication connection, the VoIP Management System 299 at step 307 monitors the packet data traffic associated with the passenger's wireless device. The VoIP Management System 299 at step 308 calculates at least one packet data transmission characteristic for this data communication session. At step 309, the determined packet data transmission characteristic(s) are compared with predetermined packet data transmission characteristic(s) and, if it is determined that this data communication session is not a voice call, no action is taken and monitoring continues.

The packet data transmission characteristics associated with VoIP packet data traffic are those which are required to ensure a viable VoIP call connection, and those associated with the typical characteristics of speech rather than data. Thus, the encrypted VoIP packet data traffic is identified via packet transmit/receive timing analysis and average packet size for common Source/Destination IP and Transport ports. For example, VoIP packet data traffic typically comprises a fairly consistent flow of Packet Data Units over a period of time. Thus, the VoIP Management System 299 searches for N packets sent/received every t seconds (e.g., ~50 packets/sec) over a time period of T seconds (e.g., 5 seconds) where the average size of the Packet Data Units are less than k bytes (e.g., 100 bytes). This pattern of factors is atypical for a data communication session but is expected for a VoIP call. The number of packets N, time frame t, and time period T are typically ranges of values; and these can be adjusted to ensure accuracy of the determination that is made. Alternatively, the Average Inter-packet receive/transmit time<t milliseconds (e.g., ~40 msec) for a duration of T seconds (e.g., 5 seconds) wherein the average packet size is less than k bytes (e.g., 100 bytes) can be determined and used as the metric for a VoIP call.

When data traffic is identified as "VoIP" using the above analysis (or other comparable packet data traffic analysis), the VoIP Management System 299 at step 310 applies some control(s) on encrypted traffic, i.e., a "latency policy" for a packet flow for some duration. The VoIP Management System 299 thereby disrupts the identified VoIP packet data traffic without modifying the packet content, such as by adding latency to the Packet Data Unit of the packet data traffic to make the VoIP services unusable. One such latency adjustment comprises systematically delaying data packets in the identified VoIP packet data traffic stream by L milliseconds (e.g., 1000 msec) for a period of time P. Alternatively (or additionally), the VoIP Management System 299 can rate limit the number of packets—x packets/y seconds (e.g., 20 packets/second) for a period of time Q. The latency delay L, rate limits of x packets and y seconds, as well as the time periods P, Q are all adjustable to ensure effectiveness of the correction that is made.

Thus, the VoIP Management System 299 unobtrusively yet accurately identifies instances of a voice call being attempted in the aircraft. While some of the responses are succinct, such as terminating the call or denying service, others are designed to not disrupt valid data traffic, but to cause VoIP communication connections to self-regulate by disconnecting. In this case, the passenger data is not analyzed or disrupted, to ensure that a valid data communication session is not disrupted, and the corrective measures do not impact the accuracy or validity of the data that is transmitted/received. Thus, the corrective measures are only VoIP impacting and designed to cause the service provider to implement the disconnection of the VoIP call.

SUMMARY

The VoIP Management System enables aircraft-based subscribers to initiate data communications, but not voice communications, regardless of the nature of the wireless device they use. This process can be used not only for aircraft-based communications but also for ground-based systems which encounter the same issues in regulating the processing of VoIP calls.

What is claimed as new and desired to be protected by Letters Patent of the United States is:

1. A system for preventing wireless devices from hosting voice calls on a data communication connection, comprising:
    network for generating radio frequency communication signals to communicate with a plurality of wireless devices and a data communication network, to enable said wireless device to establish data communication sessions, through said network, with servers connected to said data communication network; and voice call prevention means, connected to said network for inhibiting said wireless devices from hosting a voice call on a data communication connection through said network, comprising:

data monitoring, responsive to one of said wireless devices engaged in a data communication session on a data communication connection through said network, for determining weather said data communication session comprises a voice call, and call termination, responsive to detection of the presence of a voice call, for causing termination of said voice call, comprising packet processing, responsive to said data communication connection, for controllably adjusting processing of said packet data traffic carried on said data communication connection to realize a value of at least one data transmission characteristic of said packet data traffic that fails to correspond to a value of at least one data transmission characteristic of a voice call.

2. The system for preventing wireless devices from hosting voice calls of claim 1 wherein said data monitor comprises:

a data characteristic determination process memes, responsive to a packet data communication connection said network, for identifying a value of at least one data transmission characteristic of packet data traffic exchanged by said one wireless device on said packet data communication connection; and correlation for comparing said identified value of said at least one data transmission characteristic with predetermined values of voice call data transmission characteristics.

3. The system for preventing wireless devices from hosting voice calls of claim 2 wherein said data characteristic determines said value of said at least one data transmission characteristic of said packet data traffic from the class of data transmission characteristics comprising: time between successive, packet size, volume of packets transmitted per period of time, and volume of packets received per period of time.

4. The system for preventing wireless devices from hosting voice calls of claim 2 wherein said packet processor realizes a value of at least one data transmission characteristic of said packet data traffic from the class of data transmission characteristics comprising: time between successive packets, volume of packets transmitted per period of time, and volume of packets received per period of time.

5. The system for preventing wireless devices from hosting voice calls of claim 2 wherein said packet processor realizes a value of at least one data transmission characteristic of said packet data traffic exclusive of modifying content of said packet data traffic.

6. The system for preventing wireless devices from hosting voice calls of claim 1 wherein said data monitor comprises:

a communication connection address process, responsive to said data communication connection including a voice call destination, for determining that said data communication connection comprises a voice call.

7. The system for preventing wireless devices from hosting voice calls of claim 6 wherein said packet processor realizes a value of at least one data transmission characteristic of said packet data traffic from the class of data transmission characteristic comprising: time between successive packets, volume of packets transmitted per period of time, and volume of packets received per period time.

8. The system for preventing wireless devices from hosting voice calls of claim 6 wherein said packet realizes a value of at least one data transmission characteristic of said packet data traffic exclusive of modifying content of said packet data traffic.

9. The system for preventing wireless devices from hosting voice calls of claim 1 wherein said data monitor comprises:

device determination for identifying said wireless device as a voice communication device; and wherein said call termination denies service to said wireless device.

10. A method for preventing wireless device from hosting voice calls on a data communication connection, comprising:

generating in a network radio frequency communication signals to communicate with said a plurality of wireless devices and a data communication network, to enable said wireless devices to establish data communication sessions, through said network, with servers connected to said data communication network; and inhibiting said wireless devices from hosting a voice call on a data communication connection said network, comprising:

determining, in response to one of said wireless devices engaged in a data communication session on a data communication connection through said network, whether said data communication session comprises a voice call, and terminating, in response to detection of the presence of a voice call, said voice call, controllably adjusting processing, in response to said data communication, connection of packet data traffic carried on said data communication connection to realize a value of at least one data transmission characteristic of said packet data traffic that fails to correspond to a value of at least one data transmission characteristic of a voice call.

11. The method for preventing wireless devices from hosting voice calls of claim 10 wherein said step of determining comprises:

identifying, in response to a packet data communication connection through said network, a value of at least one data transmission characteristic of packet data traffic exchanged by said one wireless device on said packet data communication connection; and comparing said identified value of said at least one data transmission characteristic with predetermined values of voice call data transmission characteristics.

12. The method for preventing wireless devices from hosting voice calls of claim 11 wherein said step of determining determines said value of said at least one data transmission characteristic of said packet data traffic from the class of data transmission characteristics comprising: time between successive packets, packet size, volume of packets transmitted per period of time, and volume of packets received per period of time.

13. The method for preventing wireless device from hosting voice calls of claim 11 wherein said step of controllably adjusting processing realizes a value of at least one data transmission characteristic of said packet data traffic from the class of data transmission characteristics comprising: time between successive volume of packets transmitted per period of time, and volume of packets received per period of time.

14. The method for preventing wireless devices from hosting voice calls of claim 11 wherein said step of controllably adjusting processing realizes a value of at least one data transmission characteristic of said packet data traffic exclusive of modifying content of said packet data traffic.

15. The method for preventing wireless devices from hosting voice calls of claim 10 wherein said step of determining comprises:
   determining, in response to said communication connection including a voice call destination, that said communication connection comprises a voice call.

16. The method for preventing wireless devices from hosting voice calls of claim 15 wherein said step of controllably adjusting processing realizes a value of at least one data transmission characteristic of said packet data traffic from the class of data transmission characteristics comprising: time between successive volume of packets transmitted per period of time, and volume of packets received per period of time.

17. The method for preventing wireless devices from hosting voice calls of claim 15 wherein said step of controllably adjusting processing realizes a value of at least one data transmission characteristic of said packet data traffic exclusive of modifying content of said packet data traffic.

18. The method for preventing wireless devices from hosting voice calls of claim 10 wherein said step of determining comprises:
   identifying said wireless device as a voice communication device; and wherein said step of terminating denies service to said wireless device.

* * * * *

UNITED STATES PATENT AND TRADEMARK OFFICE
CERTIFICATE OF CORRECTION

| | | |
|---|---|---|
| PATENT NO. | : 8,185,040 B2 | |
| APPLICATION NO. | : 12/029298 | |
| DATED | : May 22, 2012 | |
| INVENTOR(S) | : Bryan A. Lauer et al. | |

It is certified that error appears in the above-identified patent and that said Letters Patent is hereby corrected as shown below:

At column 11, claim number 1, line number 2,

Please delete:

"said wireless device to establish data communication"

Correct to read:

-- said wireless devices to establish data communication --

At column 11, claim number 1, line number 9,

Please delete:

"data monitoring, responsive to one of said wireless devices"

Correct to read:

-- data monitor, responsive to one of said wireless devices --

At column 11, claim number 1, line number 12,

Please delete:

"determining weather said data communication session"

Signed and Sealed this
Tenth Day of July, 2012

David J. Kappos
*Director of the United States Patent and Trademark Office*

CERTIFICATE OF CORRECTION (continued)
U.S. Pat. No. 8,185,040 B2

Correct to read:

-- determining whether said data communication session --

At column 11, claim number 1, line number 14,

Please delete:

"call termination, responsive to detection of the presence of"

Correct to read:

-- call termination process, responsive to detection of the presence of --

At column 11, claim number 1, line number 17,

Please delete:

"packet processing, responsive to said data communication"

Correct to read:

-- packet processor, responsive to said data communication --

At column 12, claim number 10, line number 12,

Please delete:

"signals to communicate with said a plurality of wireless"

Correct to read:

-- signals to communicate with a plurality of wireless --